United States Patent [19]

Miyawaki et al.

[11] Patent Number: 5,473,411
[45] Date of Patent: Dec. 5, 1995

[54] METHOD AND APPARATUS FOR AUTOMATICALLY ADJUSTING LENS IN AUTOMATIC PRINTING/DEVELOPING MACHINE

[75] Inventors: Hiroshi Miyawaki; Mitsuhiko Itojima, both of Wakayama; Masaaki Tsuji, Hannan; Toshiro Akira; Hisahiro Maeda, both of Wakayama, all of Japan

[73] Assignee: Noritsu Koki Co., Ltd., Wakayama, Japan

[21] Appl. No.: 244,045

[22] PCT Filed: Sep. 16, 1993

[86] PCT No.: PCT/JP93/01320

§ 371 Date: May 23, 1994

§ 102(e) Date: May 23, 1994

[87] PCT Pub. No.: WO94/08271

PCT Pub. Date: Apr. 14, 1994

[30] Foreign Application Priority Data

Sep. 25, 1992 [JP] Japan ................................. 4-280974

[51] Int. Cl.⁶ .................................................. G03B 27/52
[52] U.S. Cl. ................................................ 355/55; 355/77
[58] Field of Search ................................ 355/55, 56, 57, 355/58, 59, 77, 243

[56] References Cited

U.S. PATENT DOCUMENTS

| 4,643,562 | 11/1989 | Kaneko et al. | 355/56 |
| 4,881,102 | 11/1989 | Nishijima et al. | 355/243 |
| 4,937,620 | 6/1990 | Ozawa et al. | 355/77 |

Primary Examiner—Richard A. Wintercorn
Attorney, Agent, or Firm—Oblon, Spivak, McClelland, Maier, & Neustadt

[57] ABSTRACT

The lens moving mechanism of a printing/developing apparatus has a pulse motor for moving the holding member of the exchangeable lens in the directions X and Y to finely adjust the position of the lens. The lens moving mechanism is controlled by a computer. The movement and position of the lens are specified by inputting numeric values, thus adjusting the position freely. The specified position of the lens is stored as channel data corresponding to each print channel.

12 Claims, 3 Drawing Sheets

F I G. 2
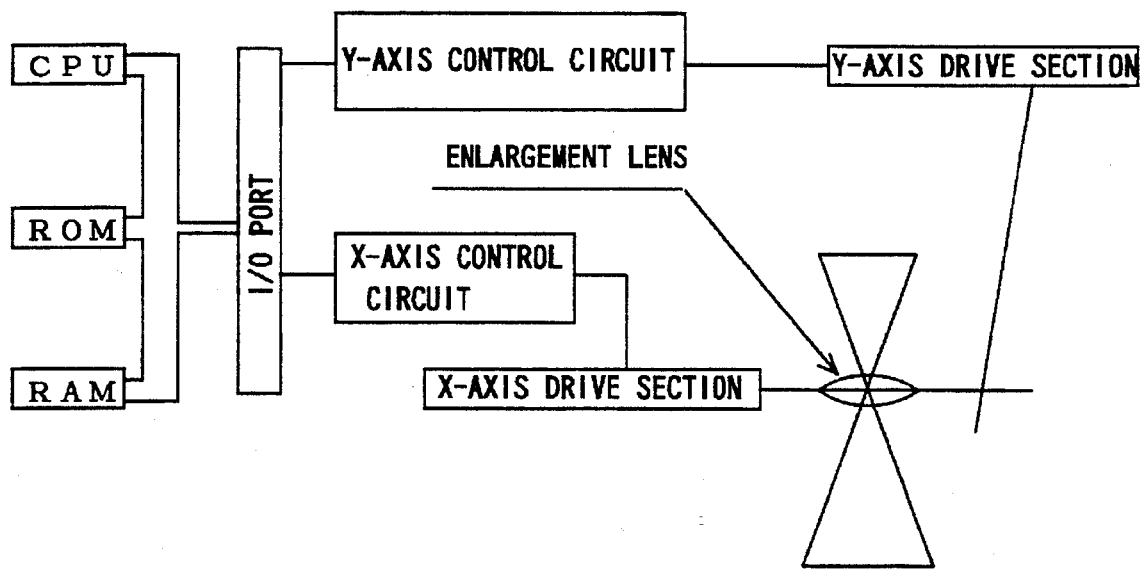

METHOD AND APPARATUS FOR AUTOMATICALLY ADJUSTING LENS IN AUTOMATIC PRINTING/DEVELOPING MACHINE

TECHNICAL FIELD

The present invention relates to a method and apparatus for automatically adjusting a projection lens for printing in an automatic photographic printing and developing apparatus in which a plurality of exchangeable lenses or a variable-focus lens are used.

BACKGROUND ART

In automatic printing/developing apparatus, the adjustment of a lens is carried out by rotating a ring or bolts of the adjustment mechanism after loosening the fixing bolts. First, a description will be made regarding the procedure of lens adjustment in a conventional printing/developing apparatus in which a plurality of fixed focus projection lenses are used for printing.

When exchanging lenses, an operator opens a protective cover and sets a lens suitable for a print size and an enlargement ratio. The operator uses a focus chart attached to a negative mask to project the image of the focus chart onto a printing paper to check whether or not the image is properly focused on the paper.

In order to adjust the focus, the operator loosens bolts of the lens, and adjusts the focus by rotating an adjustment ring while observing the image of the focus chart on the printing paper. Then, the operator lightly fastens the bolts to fix the lens for adjusting the optical axis. In this adjustment of the optical axis, the operator moves the cylindrical lens holder after loosening bolts for optical axis adjustment so that the center of the printing paper coincides with the center of the focus chart.

After fastening the bolts for optical axis adjustment to complete the adjustment of the optical axis, the inclination is also adjusted if it is required. If the inclination is adjusted, the optical axis is adjusted again. The focus is then checked, and fine adjustment is carried out to complete the adjustment of the lens.

When the lens is exchanged with a different one, another adjustment is carried out for the new lens after the exchange of lenses.

Thus, with conventional automatic printing/developing apparatus, in the case where a plurality of fixed-focus lenses are used as projection lenses for printing, the lens is exchanged whenever the enlargement ratio is changed. Therefore, the focus and the optical axis must be adjusted for each of the lenses.

Since the adjustment of the focus and the adjustment of the optical axis are manually performed after loosening the fixing bolts and the adjustment bolts, only skilled operators can carry out delicate or fine adjustments without difficulty. Even in the case where the printing is continuously carried out without changing the focus and the optical axis, they must be readjusted in the same manner as the initial adjustment when deviations occur after a lapse of time.

Also, cases may happen in which the same lens cannot be used for different printings even when the enlargement ratio is not changed, because the optical axis must be moved depending on print sizes. In the case where the lens is frequently exchanged, as described above, the position of the lens must be adjusted frequently.

In the case where a variable-focus lens is used as a projection lens for printing, an image on a printing paper moves when the focal distance is changed. Therefore, the position of the lens must be readjusted whenever the focal distance is changed.

An object of the present invention is to provide an automatic adjusting mechanism for an automatic printing/developing apparatus which is capable of delicately or finely adjusting the position of a lens when the lens is exchanged or the focal distance of the lens is changed.

DISCLOSURE OF THE INVENTION

To solve the above-described problems, in the present invention, a lens holding member is moved in an X-axis direction and a Y-axis direction perpendicular to an optical axis by a lens moving mechanism in which pulse motors are used for fine adjustment. The lens moving mechanism is controlled by a CPU so that the position of the lens is freely controlled in accordance with a numeric values which is input for designating a specified position to be moved or an amount of movement.

The specified position for the lens thus input is stored as a channel data for each print channel. When the lens has been exchanged, a channel corresponding to the newly attached lens is designated. By this designation, the lens holding member is moved in accordance with the stored data so that the lens is automatically moved to the designated position.

FIG. 1 is a flowchart for explaining a program which is stored in a memory built in a lens adjusting apparatus of an automatic printing/developing apparatus according to the present invention. As shown in FIG. 1, when the channel is altered or the lens is exchanged, it is examined whether movement data for the lens exist. When it is judged that movement data for the lens exist, the lens is moved in accordance with the movement data. When it is confirmed that the lens is positioned at a proper position, the program is ended.

When the data do not exist, or when the data must be modified, movement data for the lens are input, in accordance with which the lens is thereafter moved and positioned. When it is confirmed that the lens is positioned at a proper position, the program is ended. The input data is stored in the memory as a channel data, and is read out and used when necessary. In the case where the channel is not changed and the lens is not exchanged, a printing process is carried out with the position of the lens being maintained, because adjustment of the lens is not necessary.

FIG. 2 is a block diagram for explaining an example of a lens adjusting apparatus of an automatic printing/developing apparatus according to the present invention. The drive section for moving the lens is controlled by a computer including a ROM in which the program shown by the flowchart of FIG. 1 is stored, a CPU for executing the program, a RAM acting as a main memory, and an I/O port.

In response to signals output from the I/O port, an X-axis control circuit and a Y-axis control circuit activate an X-axis drive section and a Y-axis drive section, respectively. The enlargement lens is moved by these drive sections and is positioned. In order to finely control the movement of the lens, a lens moving mechanism having a high accuracy, such as pulse motors, is employed. In addition, output devices such as a display unit and a printer are connected to the I/0 port for monitoring the condition of the lens.

According to the method of the present invention for adjusting a lens in an automatic printing/developing apparatus, fine adjustment can be automatically carried out during the movement of the lens. Additionally, when the apparatus according to the present invention is applied to the holding member of a zoom lens, it is possible to automatically compensate for movements of images caused by changes in the enlargement ratio of the zoom lens. Moreover, if the enlargement ratio is constant, operation of changing lenses is no more necessary even when the position of the optical center must be changed. Therefore, the present invention has an advantage that a plurality of print sizes can be handled using a single lens.

BRIEF DESCRIPTION OF THE DRAWINGS

FIG. 2 is a block diagram of an embodiment of the lens adjusting apparatus of the automatic printing/developing apparatus according to the present invention.

BEST MODE FOR CARRYING OUT THE PRESENT INVENTION

Figure 1:
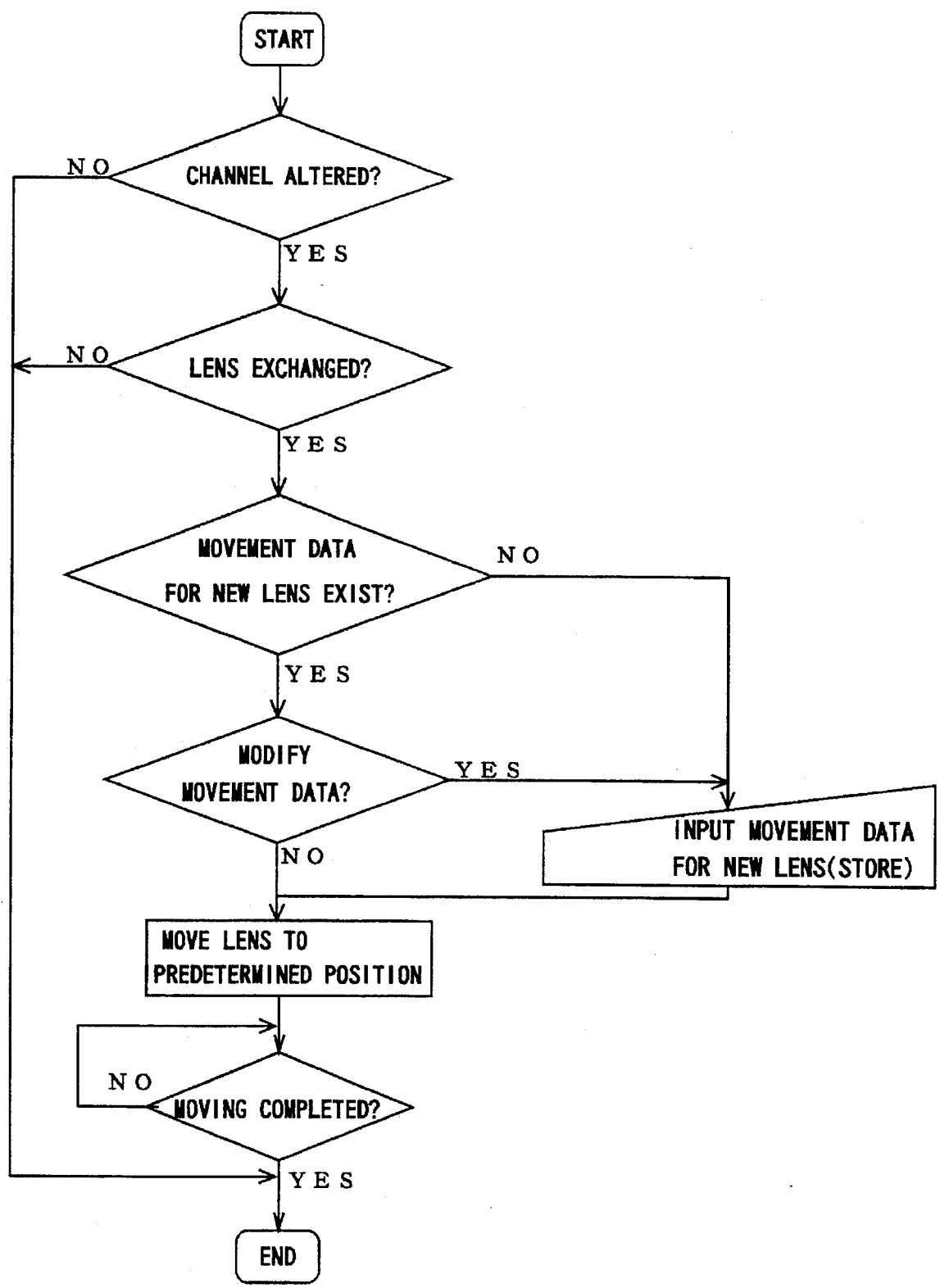
FIG. 1 is a flowchart of a program which is stored in a memory built in a lens adjusting apparatus of an automatic printing/developing apparatus according to the present invention.
Figure 3:
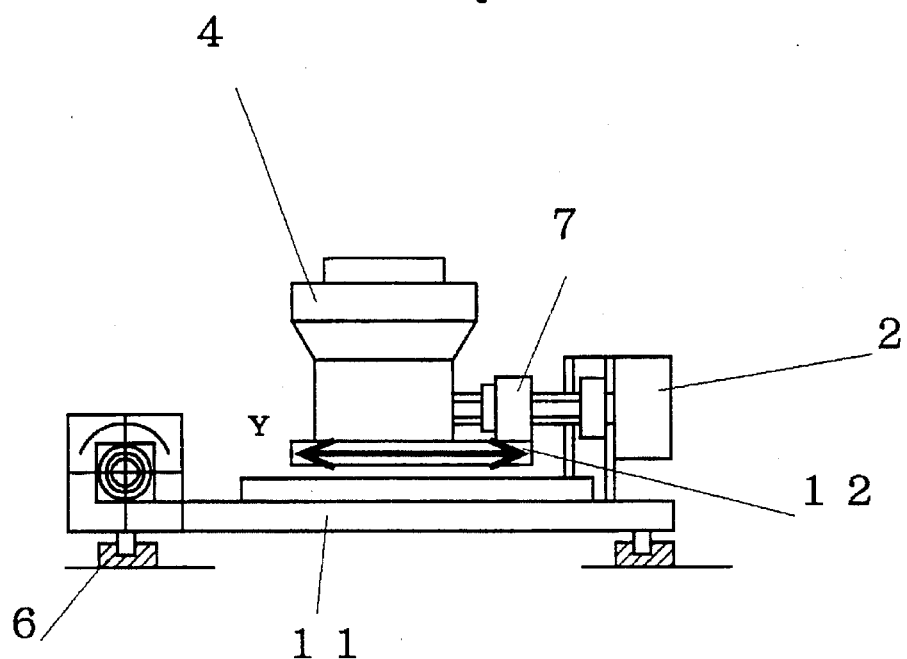
FIG. 3 is a sectional view perpendicular to the X-axis direction of an example of a lens moving mechanism used in the lens adjusting apparatus of the automatic printing/developing apparatus according to the present invention.
Figure 4:
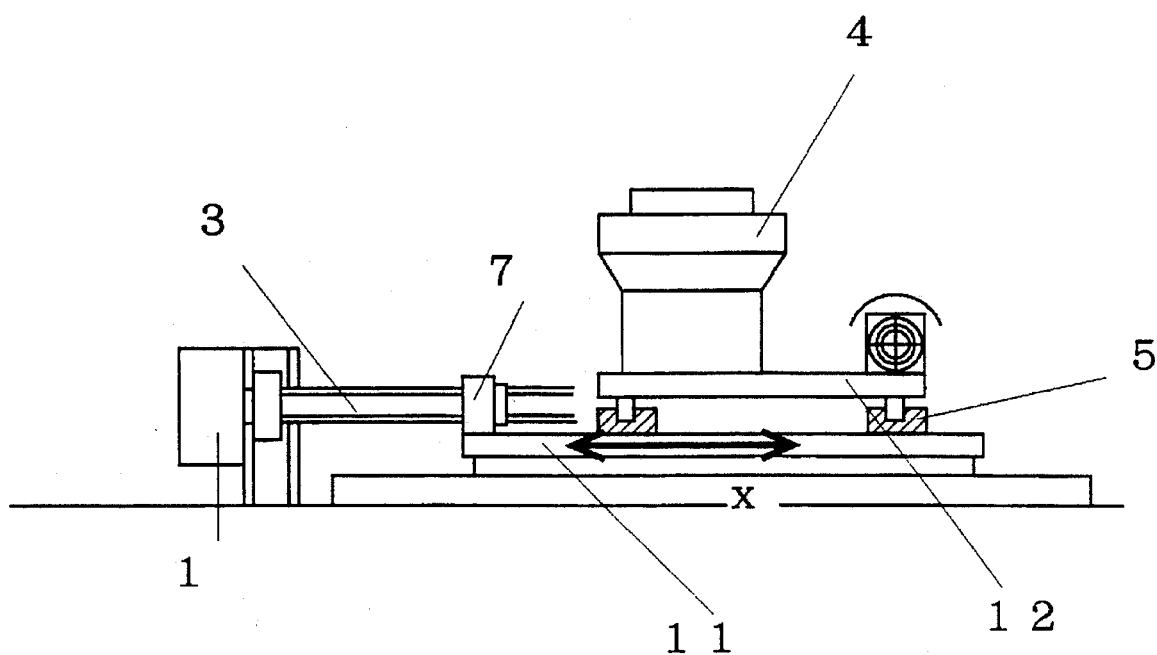
FIG. 4 is a sectional view perpendicular to the Y-axis direction of the example of the lens moving mechanism used in the lens adjusting apparatus of the automatic printing/developing apparatus according to the present invention.

An embodiment of a lens adjusting apparatus of the present invention will be described with reference to the accompanying drawings. FIG. 3 and FIG. 4 are sectional views showing an example of a lens moving mechanism used in the lens adjusting apparatus of an automatic printing/developing apparatus according to the present invention, wherein FIG. 3 is a sectional view perpendicular to the X-axis direction, and FIG. 4 is a sectional view perpendicular to the Y-axis direction.

A stepping motor 1 is connected to a lens plate 11 via a ball screw 3, and a stepping motor 2 is connected to a lens plate 12. Lens plate 11 is supported on a base via slide rails 6, while lens plate 12 is supported on the lens plate 11 base via slide rails 5.

As indicated by an arrow in FIG. 4, lens plate 11 is moved together with lens plate 12 in the X-axis direction by the stepping motor 1. As indicated by an arrow in FIG. 3, lens plate 12 on which an enlargement lens 4 is secured is moved in the Y-axis direction by the stepping motor 2. The stop positions in X-axis and Y-axis directions are controlled by the rotational amounts of the stepping motors.

We claim:

1. A method of automatically adjusting a lens in an automatic printing/developing apparatus using a plurality of exchangeable lenses and a lens holding member with an optical axis adjustment mechanism, said lens being exchangeably attached to said lens holding member, said method comprising the steps of:

storing optical axis adjustment data for the respective lenses;

selecting the optical axis adjustment data for the lens to be used; and adjusting the optical axis of the lens in accordance with the selected optical adjustment data.

2. An apparatus for automatically adjusting a lens and an automatic printing/developing apparatus using a plurality of exchangeable lenses and a lens holding member with an optical axis adjustment mechanism, said lens being exchangeably attached to said lens holding member, wherein the apparatus comprises:

means for storing optical axis adjustment data for the respective lenses;

means for selecting the optical axis adjustment data for the lens to be used; and means for adjusting the optical axis of the lens in accordance with the selected optical axis adjustment data.

3. An apparatus according to claim 2, further comprising a central processing unit (CPU); and wherein said optical axis adjustment data comprises numeric values designating specified positions of said plurality of exchangeable lenses.

4. An apparatus according to claim 3, wherein specified position data for said plurality of exchangeable lenses is stored as channel data for each print channel.

5. An apparatus according to claim 2, wherein said means for adjusting the optical axis comprises:

an X axis drive section connected to the lens holder;

an X axis control circuit connected to the X axis drive section for controlling the X axis drive section;

a Y axis drive section connected to the lens holder; and a Y axis control circuit connected to the Y axis drive section, for controlling the Y axis drive section.

6. An apparatus according to claim 5, further comprising:

an input/output port connected to the X axis control circuit and to the Y axis control circuit;

a central processing unit;

a ROM;

a RAM; and a bus connecting said central processing unit, said ROM, said RAM, and said input/output port.

7. An apparatus according to claim 2, further comprising means for compensating for movements of images caused by changes in an enlargement ratio of a zoom lens.

8. An apparatus according to claim 7, wherein said X axis drive section comprises a stepping motor.

9. An apparatus according to claim 2, wherein said means for adjusting the optical axis comprises means for moving the lens in a direction that is perpendicular to the optical axis.

10. An apparatus according to claim 2, wherein said means for adjusting the optical axis comprises means for moving the lens in a plane that is perpendicular to the optical axis.

11. An apparatus according to claim 2, wherein said means for adjusting the optical axis comprises means for moving the lens in a plane that is perpendicular to the optical axis comprising a stepper motor for moving the lens holder in a direction that is perpendicular to the optical axis.

12. A method according to claim 1, wherein said step of adjusting the optical axis comprises the step of moving the lens in a plane that is perpendicular to the optical axis.

* * * * *